United States Patent
Jeon et al.

(10) Patent No.: US 9,083,970 B2
(45) Date of Patent: Jul. 14, 2015

(54) METHOD OF DISPLAYING STEREOSCOPIC IMAGES, AND STEREOSCOPIC IMAGE DISPLAY DEVICE

(75) Inventors: Man-Bok Jeon, Yongin (KR); Woo-Chul Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 411 days.

(21) Appl. No.: 13/398,761

(22) Filed: Feb. 16, 2012

(65) Prior Publication Data

US 2012/0327072 A1    Dec. 27, 2012

(30) Foreign Application Priority Data

Jun. 23, 2011   (KR) .................... 10-2011-0061121

(51) Int. Cl.
*G06T 15/00* (2011.01)
*H04N 13/04* (2006.01)

(52) U.S. Cl.
CPC ....... *H04N 13/0497* (2013.01); *H04N 13/0438* (2013.01)

(58) Field of Classification Search
None
See application file for complete search history.

(56) References Cited

U.S. PATENT DOCUMENTS

| | | | |
|---|---|---|---|
| 2010/0165222 A1* | 7/2010 | Choi | 349/15 |
| 2010/0182402 A1* | 7/2010 | Nakajima et al. | 348/42 |
| 2010/0289872 A1* | 11/2010 | Funabiki et al. | 348/43 |
| 2010/0289883 A1* | 11/2010 | Goris et al. | 348/56 |
| 2011/0109733 A1* | 5/2011 | Kim et al. | 348/56 |
| 2011/0128287 A1* | 6/2011 | Lee et al. | 345/426 |
| 2011/0205223 A1* | 8/2011 | Lee | 345/419 |
| 2012/0038690 A1* | 2/2012 | Lee | 345/691 |
| 2012/0069145 A1* | 3/2012 | Sugimura | 348/43 |

FOREIGN PATENT DOCUMENTS

| | | |
|---|---|---|
| KR | 10-0273188 B1 | 9/2000 |
| KR | 10-2002-0082916 | 11/2002 |
| KR | 10-2008-0064514 | 7/2008 |
| KR | 10-2010-0007473 | 1/2010 |

* cited by examiner

*Primary Examiner* — Sath V Perungavoor
*Assistant Examiner* — Janese Duley
(74) *Attorney, Agent, or Firm* — Christie, Parker & Hale, LLP

(57) ABSTRACT

A method of displaying stereoscopic images is provided. By the method, a stereoscopic image frame having an active period and a vertical blank is received, a length of the vertical blank varying for each stereoscopic image frame, the stereoscopic image frame is divided into a first image frame and a second image frame based on an end point of the active period of the stereoscopic image frame, and the first image frame and the second image frame are sequentially outputted.

20 Claims, 10 Drawing Sheets

METHOD OF DISPLAYING STEREOSCOPIC IMAGES, AND STEREOSCOPIC IMAGE DISPLAY DEVICE

CROSS-REFERENCE TO RELATED APPLICATION

This application claims priority under 35 USC §119 to Korean Patent Applications No. 10-2011-0061121, filed on Jun. 23, 2011 in the Korean Intellectual Property Office (KIPO), the contents of which are incorporated herein in its entirety by reference.

BACKGROUND

1. Field

Example embodiments relate generally to an image display device. More particularly, embodiments of the inventive concept relate to a stereoscopic image display device, and a method of displaying stereoscopic images.

2. Description of Related Art

A stereoscopic image display device mostly employs binocular parallax techniques to display stereoscopic images. The binocular parallax techniques may be largely classified into glass-based techniques or glass-free techniques. Recently, a shutter glass method among the glass-based techniques has been widely used for the stereoscopic image display device. According to the shutter glasses method, a stereoscopic image may be displayed by dividing a stereoscopic image frame into a left image frame and a right image frame, and then sequentially providing the left image frame and the right image frame to the left eye and the right eye, respectively.

However, a length of a vertical blank of the stereoscopic image frame may vary for each stereoscopic image frame. Here, conventional stereoscopic image display devices may not control a length of a vertical blank of the left image frame and a length of a vertical blank of the right image frame when the stereoscopic image frame is converted into a conversion image frame (i.e., divided into the left image frame and the right image frame). As a result, a luminance difference may occur between the left image frame and the right image frame because a length of the left image frame is different from a length of the right image frame.

SUMMARY

Aspects of example embodiments are directed toward a method of displaying stereoscopic images, capable of accurately controlling a length of a vertical blank of a left image frame and a length of a vertical blank of a right image frame (e.g., capable of equalizing a length of the vertical blank of the left image frame with a length of the vertical blank of the right image frame) even when a vertical blank of a stereoscopic image frame of which a length varies for each stereoscopic image frame is divided into the left image frame and the right image frame (i.e., converted into a conversion image frame).

Aspects of example embodiments are directed toward a stereoscopic image display device capable of accurately controlling a length of a vertical blank of a left image frame and a length of a vertical blank of a right image frame (e.g., capable of equalizing a length of the vertical blank of the left image frame with a length of the vertical blank of the right image frame) even when a vertical length of a stereoscopic image frame of which a length varies for each stereoscopic image frame is divided into the left image frame and the right image frame (i.e., converted into a conversion image frame).

According to some example embodiments, a method of displaying stereoscopic images includes a step of receiving a stereoscopic image frame having an active period and a vertical blank, a length of the vertical blank varying for each stereoscopic image frame, a step of dividing the stereoscopic image frame into a first image frame and a second image frame based on an end point of the active period of the stereoscopic image frame, and a step of sequentially outputting the first image frame and the second image frame.

In example embodiments, the first image frame may correspond to a left image frame, and the second image frame may correspond to a right image frame.

In example embodiments, the first image frame may include a first active period and a first vertical blank, and the second image frame may include a second active period and a second vertical blank.

In example embodiments, a length of the first active period and a length of the second active period may each correspond to a half of a length of the active period of the stereoscopic image frame.

In example embodiments, a length of the first image frame may be determined to be the same as a length of the second image frame.

In example embodiments, a length of the first active period may be the same as a length of the second active period, and a length of the first vertical blank may be the same as a length of the second vertical blank.

In example embodiments, a length of the first image frame may be determined to be different from a length of the second image frame.

In example embodiments, a length of the first active period may be the same as a length of the second active period, and a length of the first vertical blank may be different from a length of the second vertical blank.

In example embodiments, the step of dividing the stereoscopic image frame may include a step of detecting a length of the stereoscopic image frame based on a start point of the stereoscopic image frame and the end point of the stereoscopic image frame, a step of determining a length of a conversion image frame based on the length of the stereoscopic image frame, the conversion image frame having the first image frame and the second image frame, a step of determining a length of the first image frame and a length of the second image frame by a set or predetermined ratio based on the length of the conversion image frame, a step of outputting the first image frame from the end point of the active period of the stereoscopic image frame during a time corresponding to the length of the first image frame, and a step of outputting the second image frame from an end point of the first image frame during a time corresponding to the length of the second image frame.

In example embodiments, the method may further include a step of determining the length of the first image frame to be the same as the length of the active period of the stereoscopic image frame when the length of the stereoscopic image frame is more than twice as long as the length of the active period of the stereoscopic image frame.

In example embodiments, the length of the conversion image frame may correspond to the length of the stereoscopic image frame.

In example embodiments, the length of the conversion image frame may correspond to a cumulative mean of lengths of all stereoscopic image frames.

In example embodiments, the length of the conversion image frame may correspond to a set or predetermined length.

According to some example embodiments, a stereoscopic image display device includes a stereoscopic image receiving unit that receives a stereoscopic image frame having an active period and a vertical blank, a length of the vertical blank varying for each stereoscopic image frame, a stereoscopic image processing unit that divides the stereoscopic image frame into a first image frame and a second image frame based on an end point of the active period of the stereoscopic image frame, and a displaying unit that sequentially outputs the first image frame and the second image frame.

In example embodiments, the first image frame may correspond to a left image frame, and the second image frame may correspond to a right image frame.

In example embodiments, the first image frame may include a first active period and a first vertical blank, and the second image frame may include a second active period and a second vertical blank.

In example embodiments, the stereoscopic image processing unit may determine a length of the first image frame to be the same as a length of the second image frame.

In example embodiments, the stereoscopic image processing unit may determine a length of the first image frame to be different from a length of the second image frame.

In example embodiments, the stereoscopic image processing unit may include a detecting unit that detects a length of the stereoscopic image frame based on a start point of the stereoscopic image frame and the end point of the stereoscopic image frame, a first determining unit that determines a length of a conversion image frame based on the length of the stereoscopic image frame, the conversion image frame having the first image frame and the second image frame, a second determining unit that determines a length of the first image frame and a length of the second image frame by a set or predetermined ratio based on the length of the conversion image frame, and an outputting unit that outputs the first image frame from the end point of the active period of the stereoscopic image frame during a time corresponding to the length of the first image frame, and that outputs the second image frame from an end point of the first image frame during a time corresponding to the length of the second image frame.

In example embodiments, the left image frame may be displayed on a left shutter, and the right image frame may be displayed on a right shutter when a shutter glasses method is employed.

Therefore, a method of displaying stereoscopic images according to example embodiments may provide a high-quality stereoscopic image by accurately controlling a length of a vertical blank of a left image frame and a length of a vertical blank of a right image frame (e.g., by equalizing a length of the vertical blank of the left image frame with a length of the vertical blank of the right image frame), even when a vertical blank of a stereoscopic image frame of which a length varies for each stereoscopic image frame is divided into the left image frame and the right image frame (i.e., converted into a conversion image frame).

Further, a stereoscopic image display device according to example embodiments may provide a high-quality stereoscopic image by accurately controlling a length of a vertical blank of a left image frame and a length of a vertical blank of a right image frame (e.g., by equalizing a length of the vertical blank of the left image frame with a length of the vertical blank of the right image frame), even when a vertical blank of a stereoscopic image frame of which a length varies for each stereoscopic image frame is divided into the left image frame and the right image frame (i.e., converted into a conversion image frame).

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
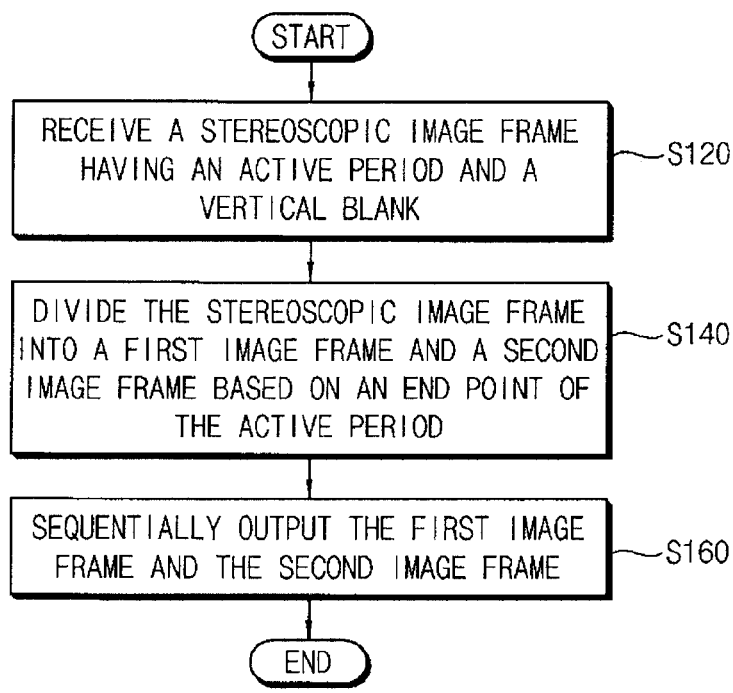
FIG. 1 is a flow chart illustrating a method of displaying stereoscopic images according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element, or one or more intervening elements may be present therebetween. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of displaying stereoscopic images according to example embodiments.

Referring to FIG. 1, the method of FIG. 1 may include a step of receiving a stereoscopic image frame having an active period and a vertical blank of which a length varies for each stereoscopic image frame (Step S120), a step of dividing the stereoscopic image frame into a first image frame and a second image frame based on an end point of the active period of the stereoscopic image frame (Step S140), and a step of sequentially outputting the first image frame and the second image frame (Step S160).

Generally, a stereoscopic image display technique displays a stereoscopic image by dividing a stereoscopic image frame into a left image frame and a right image frame, and then providing the left image frame and the right image frame to a left eye and a right eye, respectively. For example, a shutter glasses method may display the stereoscopic image by dividing the stereoscopic image frame into the left image frame and the right image frame, by sequentially displaying the left image frame on a left shutter and the right image frame on a right shutter, and then by performing open/close operations of the left shutter and the right shutter in synchronization with the left image frame and the right image frame. In detail, the left shutter may open and the right shutter may close when the left image frame is displayed on the left shutter. In the same manner, the left shutter may close and the right shutter may open when the right image frame is displayed on the right shutter. A viewer cannot recognize a timing difference of these operations because these operations are repeated so fast. Thus, the viewer may watch the stereoscopic image by sequentially watching the left image frame displayed on the left shutter and the right image frame displayed on the right shutter. However, when a stereoscopic image frame having a vertical blank of which a length varies for each stereoscopic image frame is divided into a left image frame and a right image frame, conventional stereoscopic image techniques cannot distribute the vertical blank of the stereoscopic image frame to the left image frame and the right image frame by a required ratio for systems (e.g., by a ratio of 1:1). As a result, a luminance difference between the left image frame and the right image frame may occur because a length of a vertical blank of the left image frame is different from a length of a vertical blank of the right image frame.

To solve this problem, the method of FIG. 1 may receive a stereoscopic image frame having an active period and a vertical blank of which a length varies for each stereoscopic image frame (Step S120), and may divide the stereoscopic image frame into a first image frame and a second image frame based on an end point of the active period of the stereoscopic image frame (Step S140). The first image frame may include a first active period corresponding to first image data and a first vertical blank for displaying the first image data. The second image frame may include a second active period corresponding to second image data and a second vertical blank for displaying the second image data. In some example embodiments, a stereoscopic image signal having a plurality of stereoscopic image frames may be input by a high definition multimedia interface (HDMI). Each stereoscopic image frame of the stereoscopic image signal may be divided into the first image frame and the second image frame by the method of FIG. 1. The first image frame may correspond to a left image frame, and the second image frame may correspond to a right image frame. Generally, a length of the active period of the stereoscopic image frame does not vary for each stereoscopic image frame. However, a length of the vertical blank of the stereoscopic image frame may vary for each stereoscopic image frame due to a frame rate conversion, a pre-processing, etc. Hence, a length of each stereoscopic image frame of the stereoscopic image signal may be different from each other.

In this situation, a vertical blank of the stereoscopic image frame may not be distributed to the first image frame and the second image frame by a required ratio for systems (e.g., by a ratio of 1:1) if a length of the stereoscopic image frame is not calculated (i.e., reflected) when the stereoscopic image frame is converted into a conversion image frame (i.e., divided into the first image frame and the second image frame). Thus, the method of FIG. 1 may divide the stereoscopic image frame into the first image frame and the second image frame by a set or predetermined ratio (e.g., by a ratio of 1:1) by reflecting a length of the stereoscopic image frame in real time. As a result, a vertical blank of the stereoscopic image frame may be distributed to the first image frame and the second image frame by a required ratio for systems (e.g., by a ratio of 1:1). In detail, the method of FIG. 1 may divide the stereoscopic image frame based on an end point of the active period of the stereoscopic image frame (i.e., a start point of the vertical blank of the stereoscopic image frame). Here, the method of FIG. 1 may detect a length of the stereoscopic image frame based on a start point of the stereoscopic image frame and an end point of the stereoscopic image frame, and may determine a length of the conversion image frame having the first image frame and the second image frame based on a length of the stereoscopic image frame, and may determine a length of the first image frame and a length of the second image frame by a set or predetermined ratio (e.g., by a ratio of 1:1) based on a length of the conversion image frame. Then, the method of FIG. 1 may output the first image frame from an end point of the active period of the stereoscopic image frame during a time corresponding to a length of the first image frame, and may output the second image frame from an end point of the first image frame during a time corresponding to a length of the second image frame.

In one example embodiment, a length of the first image frame may be determined to be the same as a length of the second image frame. Here, a length of the first active period of the first image frame may be the same as a length of the second active period of the second image frame, and a length of the first vertical blank of the first image frame may be the same as a length of the second vertical blank of the second image frame. In another example embodiment, a length of the first image frame may be determined to be different from a length of the second image frame. Here, a length of the first active period of the first image frame may be the same as a length of the second active period of the second image frame, and a length of the first vertical blank of the first image frame may be different from a length of the second vertical blank of the second image frame. In addition, a length of the first active period of the first image frame and a length of the second active period of the second image frame may correspond to a half of a length of the active period of the stereoscopic image frame, respectively. That is, the active period of the stereoscopic image frame may be distributed to the first image frame and the second image frame by a ratio of 1:1. A length of the first vertical blank may be calculated by subtracting a length of the first active period from a length of the first image frame because the first image frame includes the first active period and the first vertical blank. A length of the second vertical blank may be calculated by subtracting a length of the second active period from a length of the second image frame because the second image frame includes the second active period and the second vertical blank. A length of the stereoscopic image frame may correspond to a length between a start point of the stereoscopic image frame and an end point of the stereoscopic image frame (i.e., a start point of a next stereoscopic image frame). In one example embodiment, a length of the conversion image frame (i.e., sum of the first image frame and the second image frame) may be the same as a length of the stereoscopic image frame.

After the stereoscopic image frame is divided into the first image frame and the second image frame, the method of FIG. 1 may sequentially output the first image frame and the second image frame (Step S160) to implement a stereoscopic image. In one example embodiment, the method of FIG. 1 may employ the shutter glasses method. In another example embodiment, the method of FIG. 1 may employ the parallax barrier method. As described above, the method of FIG. 1 may divide the stereoscopic image frame into the first image frame (e.g., a left image frame) and the second image frame (e.g., a right image frame), and may sequentially provide the first image frame and the second image frame to a left eye and a right eye, respectively. In some example embodiments, the method of FIG. 1 may generate a synchronization signal for providing the first image frame and the second image frame to the left eye and the right eye, respectively. In case of the shutter glasses method, the first image frame and the second image frame may be synchronized with a left shutter and a right shutter based on the synchronization signal.

Accordingly, even when the stereoscopic image frame in which a length of the vertical period varies for each stereoscopic image frame is divided into the first image frame (e.g., a left image frame) and the second image frame (e.g., a right image frame), the method of FIG. 1 may accurately control a length of the first image frame and a length of the second image frame by calculating (i.e., reflecting) a length of the stereoscopic image frame in real time. Hence, the vertical blank of the stereoscopic image frame may be distributed to the first image frame and the second image frame by a required ratio for systems (e.g., by a ratio of 1:1). As a result, the method of FIG. 1 may prevent or reduce a luminance difference between the first image frame and the second image frame by determining a length of the first vertical blank of the first image frame to be the same as a length of the second vertical blank of the second image frame, or may induce an intentional luminance difference between the first image frame and the second image frame by determining a length of the first vertical blank of the first image frame to be different from a length of the second vertical blank of the second image frame. Therefore, a quality of the stereoscopic image may be improved because a phenomenon such as a flicker is prevented or reduced. In some example embodiments, the method of FIG. 1 may be implemented by a hardware system, and/or a software system.

Figure 2:
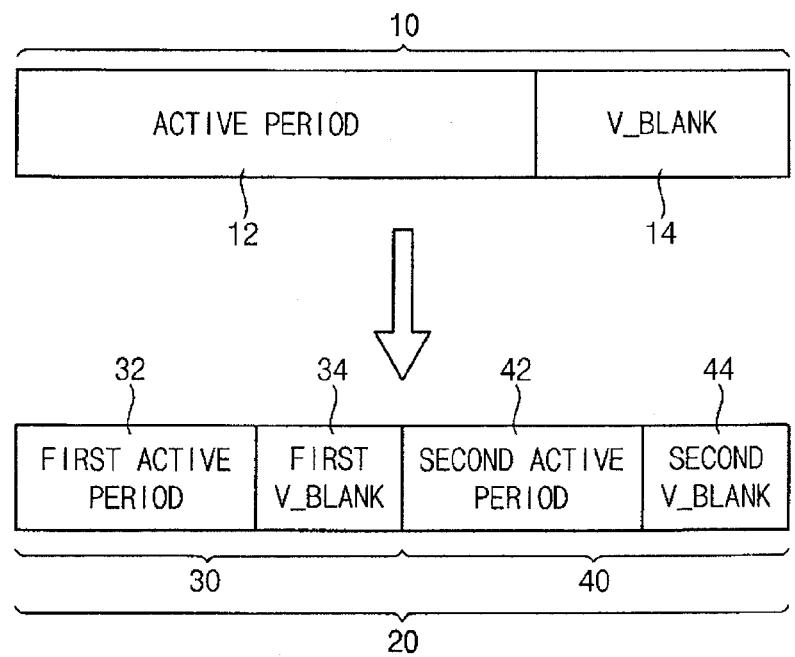
FIG. 2 is a diagram illustrating a conversion image frame having a first image frame and a second image frame generated from a stereoscopic image frame.

FIG. 2 is a diagram illustrating a conversion image frame, having a first image frame and a second image frame, generated from a stereoscopic image frame.

Referring to FIG. 2, the stereoscopic image frame 10 may be converted into the conversion image frame 20. That is, the stereoscopic image frame 10 may be divided into the first image frame 30 and the second image frame 40. A stereoscopic image signal (e.g., Side by Side, Top & Bottom, Double Frame, etc.) may include a plurality of stereoscopic image frames 10. Here, each stereoscopic image frame 10 may be divided into the first image frame 30 and the second image frame 40. For example, the stereoscopic image frame 10 of 60 Hz may be divided into the first image frame 30 of 120 Hz (e.g., a left image frame) and the second image frame 40 of 120 Hz (e.g., a right image frame). The stereoscopic image frame 10 may include an active period 12 corresponding to stereoscopic image data, and a vertical blank 14 for displaying the stereoscopic image data. Here, a length of the vertical blank 14 varies for each stereoscopic image frame due to a frame rate conversion, a pre-processing, etc.; whereas a length of the active period 12 may have a constant value. The first image frame 30 may include a first active period 32 corresponding to first image data, and a first vertical blank 34 for displaying the first image data. The second image frame 40 may include a second active period 42 corresponding to second image data, and a second vertical blank 44 for displaying the second image data. As described above, when the stereoscopic image frame 10 is divided into the first image frame 30 and the second image frame 40, the first image frame may be output from an end point of the active period 12 (i.e., a start point of the vertical blank 14), and the second image frame may be output from an end point of the first image frame 30.

In one example embodiment, a length of the stereoscopic image frame 10 may be the same as a length of the conversion image frame 20. In this case, as the stereoscopic image frame 10 is divided into the first image frame 30 and the second image frame 40 by a ratio of 1:1, a length of the first active period 32 may be the same as a length of the second active period 42, and a length of the first vertical blank 34 may be the same as a length of the second vertical blank 44. On the other hand, as the stereoscopic image frame 10 is divided into the first image frame 30 and the second image frame 40 by a ratio of 1:n, a length of the first active period 32 may be the same as a length of the second active period 42, and a length of the first vertical blank 34 may be different from a length of the second vertical blank 44. Here, a length of the first active period 32 and a length of the second active period 42 may correspond to a half of a length of the active period 12 of the stereoscopic image frame 10, respectively. In another example embodiment, a length of the stereoscopic image frame 10 may be different from a length of the conversion image frame 20. For example, a length of the conversion image frame 20 may correspond to a set or predetermined length, or a length of the conversion image frame 20 may correspond to a cumulative mean of lengths of all stereoscopic image frames 10 (here, "a cumulative mean of lengths of all stereoscopic image frames" can refer to "a cumulative moving average" or the average of all lengths of all stereoscopic image frames up until the current stereoscopic image frame). According to required conditions for systems, a length of the conversion image frame 20 may be determined by various methods. In some example embodiments, a stereoscopic image signal having a plurality of stereoscopic image frames 10 may be input by a high definition multimedia interface (HDMI). Here, each stereoscopic image frame 10 may be divided into the first image frame 30 and the second image frame 40 by the method of FIG. 1. The first image frame 30 may correspond to a left image frame. The second image frame 40 may correspond to a right image frame.

Figure 3:
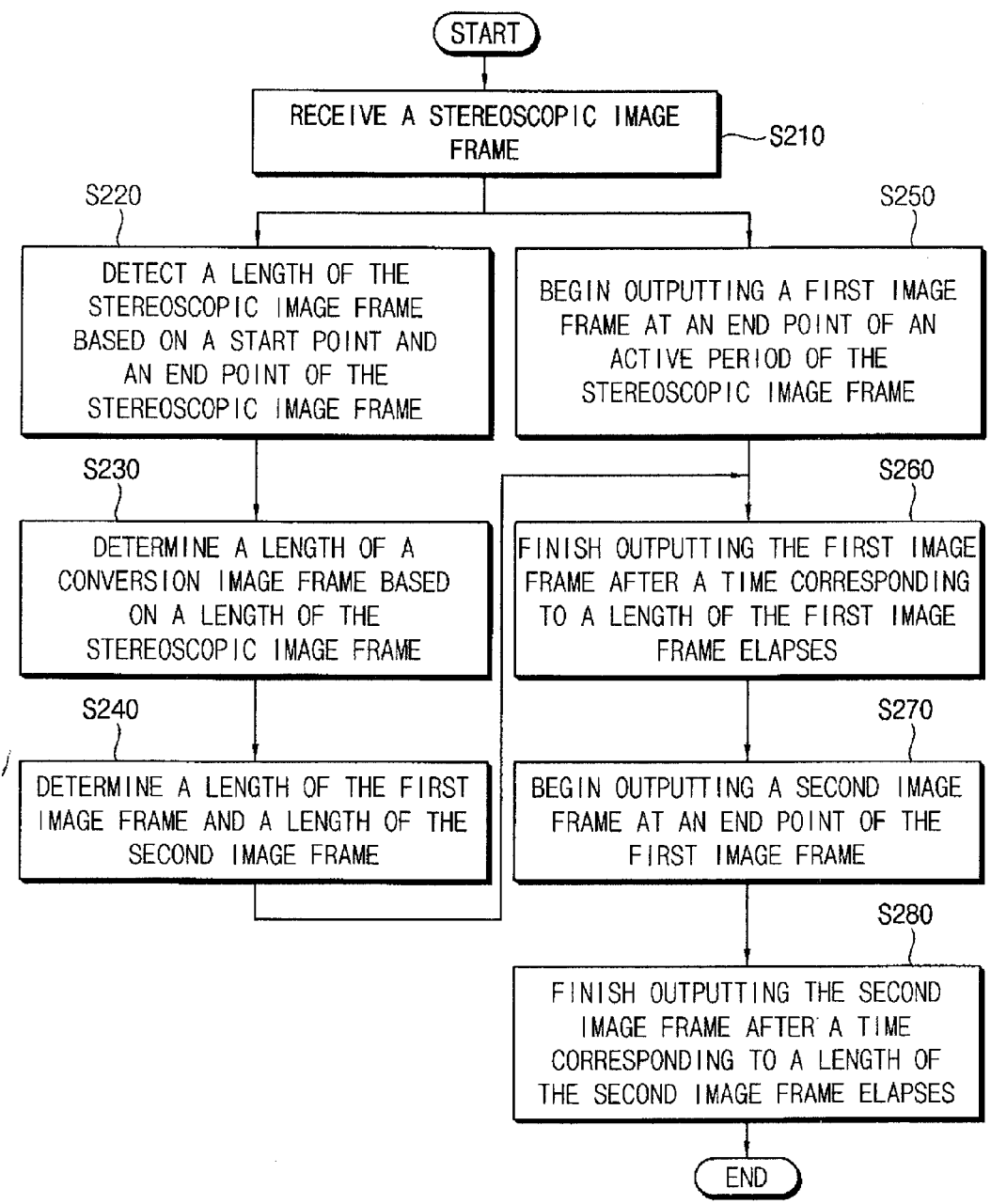
FIG. 3 is a flow chart illustrating an example in which a stereoscopic image frame is converted into a conversion image frame by a method of FIG. 1.

FIG. 3 is a flow chart illustrating an example in which a stereoscopic image frame is converted into a conversion image frame by a method of FIG. 1.

Referring to FIG. 3, the method of FIG. 1 may receive the stereoscopic image frame (Step S210) to convert the stereoscopic image frame into the conversion image frame (i.e., to divide the stereoscopic image frame into the first image frame and the second image frame). The method of FIG. 1 may detect a length of the stereoscopic image frame based on a start point of the stereoscopic image frame and an end point of the stereoscopic image frame (Step S220), may determine a length of the conversion image frame based on a length of the stereoscopic image frame (Step S230), and may determine a length of the first image frame and a length of the second image frame (Step S240). In Step S220, a length of the stereoscopic image frame may correspond to a length between a start point of the stereoscopic image frame and an end point of the stereoscopic image frame (i.e., a start point of a next stereoscopic image frame). In Step S230, a length of the conversion image frame (i.e., sum of the first image frame and the second image frame) may be substantially the same as a length of the stereoscopic image frame. Alternatively, a length of the conversion image frame (i.e., sum of the first image frame and the second image frame) may be different from a length of the stereoscopic image frame. In this case, a length of the conversion image frame may correspond to a set or predetermined length, or a length of the conversion image frame may correspond to a cumulative mean of a length of the stereoscopic image frame. In Step S240, a length of the first image frame and a length of the second image frame may be determined based on a set or predetermined ratio. Here, the set or predetermined ratio may be determined according to required conditions for systems. Generally, it is required that a length of the first image frame is the same as a length of the second image frame. In this case, a luminance difference between the first image frame and the second image frame may not occur because a first vertical blank of the first image frame is the same as a second vertical blank of the second image frame.

The method of FIG. 1 may begin outputting the first image frame at an end point of the active period (i.e., a start point of the vertical blank) of the stereoscopic image frame (Step S250), and may finish outputting the first image frame after a time corresponding to a length of the first image frame elapses (Step S260). In Step S250, an end point of the active period (i.e., a start point of the vertical blank) of the stereoscopic image frame may be substantially the same as a start point of the first image frame. In Step S260, a length of the stereoscopic image frame may be calculated in real time because an end point of the stereoscopic image frame is detected while the first image frame is output. As a result, the stereoscopic image frame may be divided into the first image frame and the second image frame by a set or predetermined ratio (e.g., by a ratio of 1:1) by calculating (i.e., reflecting) a length of the stereoscopic image frame in real time. Then, the method of FIG. 1 may begin outputting the second image frame at an end point of the first image frame (Step S270), and may finish outputting the second image frame after a time corresponding to a length of the second image frame elapses (Step S280). In Step S270, an end point of the first image frame may be substantially the same as a start point of the second image frame. In Step S280, if an active period of a next stereoscopic image frame ends while the second image frame is output, the second image frame may be forced to end at an end point of the active period of the next stereoscopic image frame. The first image frame may correspond to a left image frame. The second image frame may correspond to a right image frame.

As described above, the method of FIG. 1 may detect an end point of the stereoscopic image frame while the first image frame is output because the stereoscopic image frame is converted into the conversion image frame (i.e., divided into the first image frame and the second image frame) from an end point of the active period of the stereoscopic image frame. Thus, the method of FIG. 1 may divide the stereoscopic image frame into the first image frame and the second image frame by a set or predetermined ratio (e.g., by a ratio of 1:1) by calculating (i.e., reflecting) a length of the stereoscopic image frame in real time. Namely, the method of FIG. 1 may accurately control a length of the first vertical blank of the first image frame and a length of the second vertical blank of the second image frame even when a length of the stereoscopic image frame varies for each stereoscopic image frame. Thus, a luminance difference between the first image frame and the second image frame is efficiently controlled, so that a quality of the stereoscopic image may be improved because a phenomenon such as a flicker is prevented by the method of FIG. 1.

Figure 4:
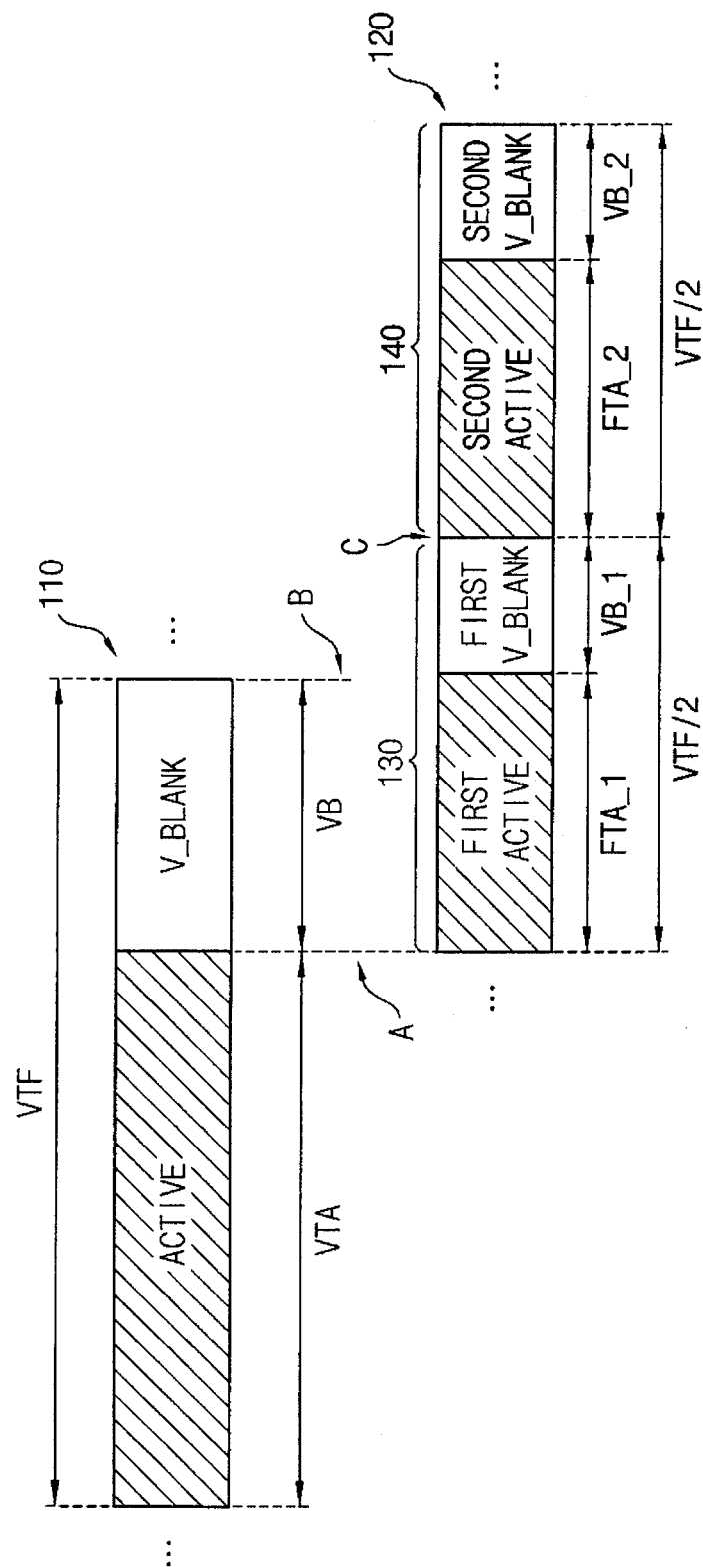
FIG. 4 is a diagram illustrating an example of a conversion image frame that is generated from a stereoscopic image frame in FIG. 3.

FIG. 4 is a diagram illustrating an example of a conversion image frame that is generated from a stereoscopic image frame in FIG. 3.

Referring to FIG. 4, the stereoscopic image frame 110 may be converted into the conversion image frame 120 by the method of FIG. 1. The stereoscopic image frame 110 may include an active period VTA corresponding to stereoscopic image data, and a vertical blank VB for displaying the stereoscopic image data. As described above, a length VTF of the stereoscopic image frame 110 may vary for each stereoscopic image frame because a length of the vertical blank VB of the stereoscopic image frame 110 varies for each stereoscopic image frame. The conversion image frame 120 may include a first image frame 130 and a second image frame 140. The first image frame 130 may correspond to a left image frame. The second image frame 140 may correspond to a right image frame. The first image frame 130 may include a first active period FTA_1 corresponding to first image data, and a first vertical blank VB_1 for displaying the first image data. The second image frame 140 may include a second active period FTA_2, and a second vertical blank VB_2 for displaying the second image data.

As illustrated in FIG. 4, the first image frame 130 may be output from an end point A of the active period VTA of the stereoscopic image frame 110. Here, the first image frame 130 may be output during a time corresponding to a length VTF/2, which is determined based on a length VTF of the stereoscopic image frame 110. The second image frame 140 may be output from an end point C of the first image frame 130. Here, the second image frame 140 may be output during a time corresponding to a length VTF/2, which is determined based on a length VTF of the stereoscopic image frame 110. In FIG. 4, it is illustrated that a length VTF/2 of the first image frame 130 is the same as a length VTF/2 of the second image frame 140 when the stereoscopic image frame 110 is divided into the first image frame 130 and the second image frame 140. That is, the stereoscopic image frame 110 may be divided into the first image frame 130 and the second image frame 130 by a ratio of 1:1. In addition, it is illustrated that a length VTF of the stereoscopic image frame 110 is the same as a length of the conversion image frame 120 (i.e., sum of the first image frame 130 and the second image frame 140). However, the present invention is not limited to illustrations of FIG. 4. A length of the conversion image frame 120 may be determined based on a length VTF of the stereoscopic image frame 110. In example embodiments, a length VTF of the stereoscopic image frame 110 may be different from a length of the conversion image frame 120 (i.e., sum of the first image frame 130 and the second image frame 140). For example, a length of the conversion image frame 120 may correspond to a set or predetermined length, or a length of the conversion image frame 120 may correspond to a cumulative mean of lengths of all stereoscopic image frames 110.

An end point B of the stereoscopic image frame 110 may be detected while the first image frame 130 is output because the first image frame 130 is output from an end point A of the active period VTA of the stereoscopic image frame 110. Hence, even when a length VTF of the stereoscopic image frame 110 varies for each stereoscopic image frame, the stereoscopic image frame 100 may be divided into the first image frame 130 and the second image frame 140 by calculating (i.e., reflecting) a length VTF of the stereoscopic image frame 110 in real time. For example, as illustrated in FIG. 4, a length VTF/2 of the first image frame 130 and a length VTF/2 of the second image frame 140 may be determined to be a half of a length VTF of the stereoscopic image frame 110, respectively. An end point B of the stereoscopic image frame 110 may correspond to a start point of a next stereoscopic image frame. As described above, a length of the first active period FTA_1 and a length of the second active period FTA_2 may correspond to a half of a length of the active period VTA of the stereoscopic image frame 110. In example embodiments, a length of the active period VTA of the stereoscopic image frame 110 may have a constant value, and a length of the first vertical blank VB_1 may be the same as a length of the second vertical blank VB_2. As a result, a luminance difference between the first image frame 130 and the second image frame 140 may be prevented or reduced because a time for which the first image data is displayed in the first image frame 130 is substantially the same as a time for which the second image data is displayed in the second image frame 140.

Figure 5:
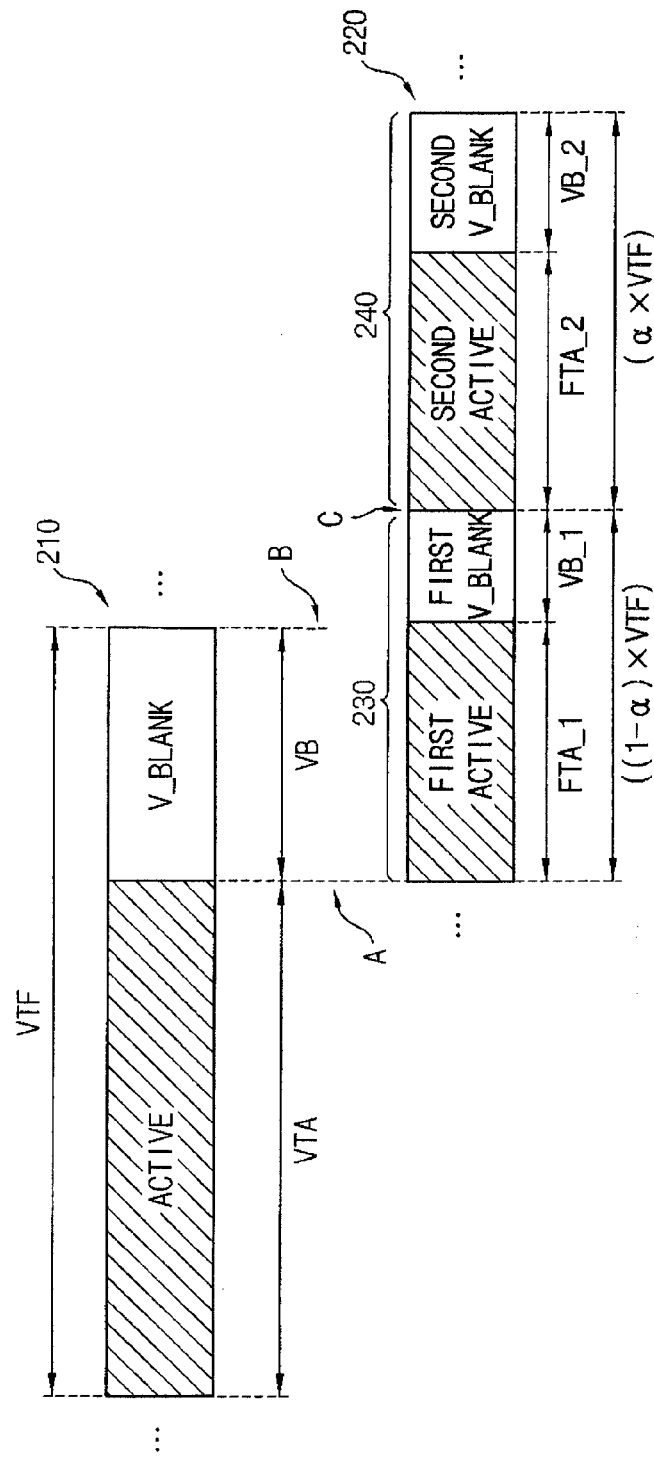
FIG. 5 is a diagram illustrating another example of a conversion image frame that is generated from a stereoscopic image frame in FIG. 3.

FIG. 5 is a diagram illustrating another example of a conversion image frame that is generated from a stereoscopic image frame in FIG. 3.

Referring to FIG. 5, the stereoscopic image frame 210 may be converted into the conversion image frame 220 by the method of FIG. 1. The stereoscopic image frame 210 may include an active period VTA corresponding to stereoscopic image data, and a vertical blank VB for displaying the stereoscopic image data. As described above, a length VTF of the stereoscopic image frame 210 may vary for each stereoscopic image frame because a length of the vertical blank VB of the stereoscopic image frame 210 varies for each stereoscopic image frame. The conversion image frame 220 may include a first image frame 230 and a second image frame 240. The first image frame 230 may correspond to a left image frame. The second image frame 240 may correspond to a right image frame. The first image frame 230 may include a first active period FTA_1 corresponding to first image data, and a first vertical blank VB_1 for displaying the first image data. The second image frame 240 may include a second active period FTA_2, and a second vertical blank VB_2 for displaying the second image data.

As illustrated in FIG. 5, the first image frame 230 may be output from an end point A of the active period VTA of the stereoscopic image frame 210. After a length of the conversion image frame 220 is determined based on a length VTF of the stereoscopic image frame 210, a length $(1-\alpha) \times$VTF of the first image frame 230 and a length $\alpha \times$VTF of the second image frame 240 may be determined by a set or predetermined ratio (i.e., by a ratio of $(1-\alpha):\alpha$) based on a length of the conversion image frame 220. Here, the set or predetermined ratio may be determined according to required conditions for systems. In FIG. 5, it is illustrated that a length VTF of the stereoscopic image frame 210 is the same as a length of the conversion image frame 220 (i.e., sum of the first image frame 230 and the second image frame 240). However, the present invention is not limited to illustrations of FIG. 5. A length of the conversion image frame 220 may be determined based on a length VTF of the stereoscopic image frame 210. In example embodiments, a length VTF of the stereoscopic image frame 210 may be different from a length of the conversion image frame 220 (i.e., sum of the first image frame 230 and the second image frame 240). As described above, the first image frame 230 may be output from an end point A of the active period VTA during a time corresponding to a length $(1-\alpha) \times$VTF of the first image frame 230, and the second image frame 240 may be output from an end point C of the first image frame 230 during a time corresponding to a length $\alpha \times$VTF of the second image frame 240. For example, a length of the conversion image frame 220 may correspond to a set or predetermined length, or a length of the conversion image frame 220 may correspond to a cumulative mean of lengths of all stereoscopic image frames 210.

An end point B of the stereoscopic image frame 210 may be detected while the first image frame 230 is output because the first image frame 230 is output from an end point A of the active period VTA of the stereoscopic image frame 210. Hence, even when a length VTF of the stereoscopic image frame 210 varies for each stereoscopic image frame, the stereoscopic image frame 210 may be divided into the first image frame 230 and the second image frame 240 by calculating (i.e., reflecting) a length VTF of the stereoscopic image frame 210 in real time. For example, as illustrated in FIG. 5, a length $(1-\alpha) \times$VTF of the first image frame 230 and a length $\alpha \times$VTF of the second image frame 240 may be determined by a set or predetermined ratio (i.e., by a ratio of $(1-\alpha):\alpha$) even when a length VTF of the stereoscopic image frame 210 varies for each stereoscopic image frame. An end point B of the stereoscopic image frame 210 may correspond to a start point of a next stereoscopic image frame. As described above, a length of the first active period FTA_1 and a length of the second active period FTA_2 may correspond to a half of a length of the active period VIA of the stereoscopic image frame 210. In example embodiments, a length of the active period VTA of the stereoscopic image frame 210 may have a constant value, and a length of the first vertical blank VB_1 may be different from a length of the second vertical blank VB_2. As a result, an intentional luminance difference between the first image frame 230 and the second image frame 240 may be induced because a time for which the first image data is displayed in the first image frame 230 is different from a time for which the second image data is displayed in the second image frame 240.

Figure 6:
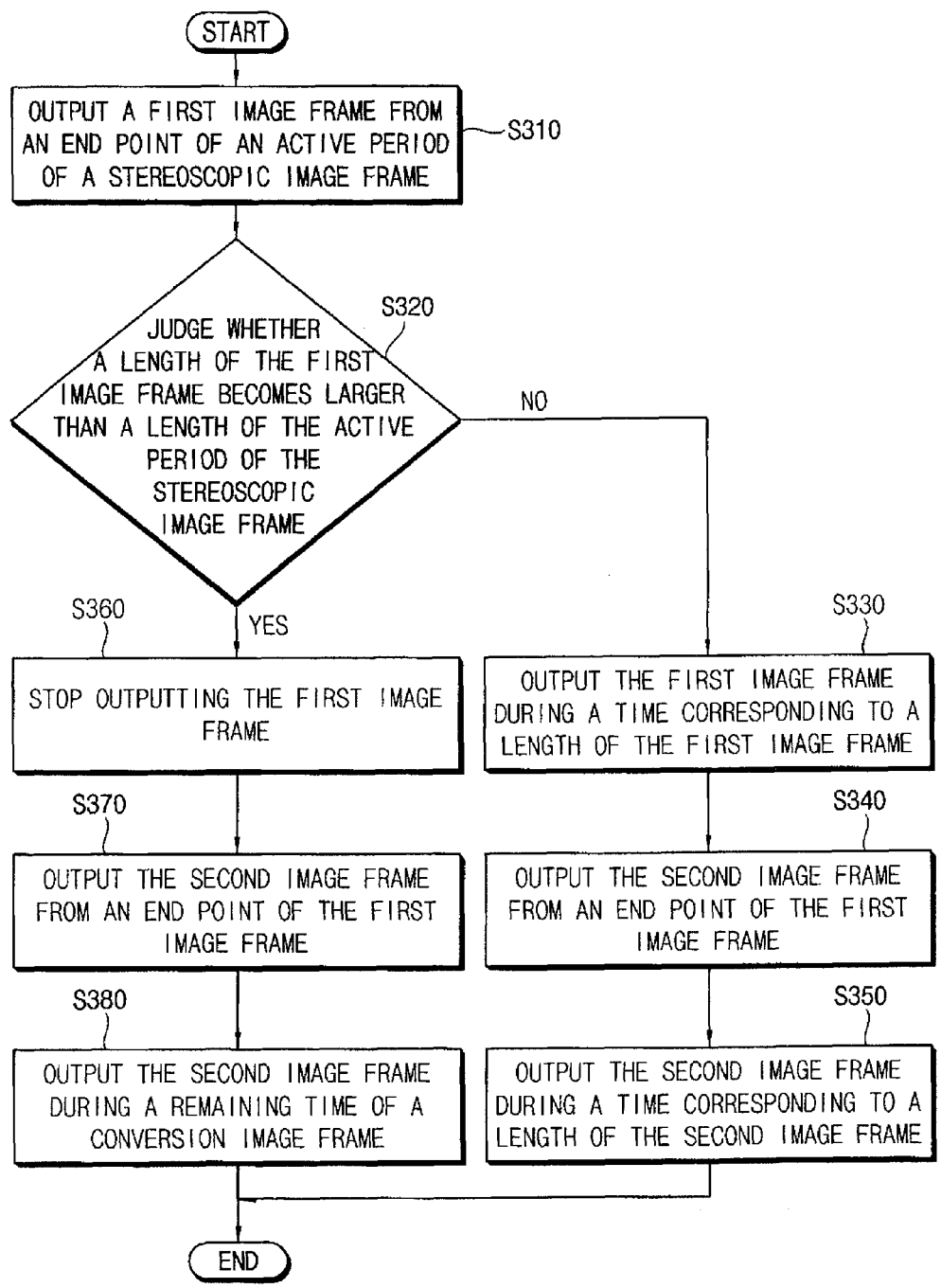
FIG. 6 is a flow chart illustrating another example in which a stereoscopic image frame is converted into a conversion image frame by a method of FIG. 1.

FIG. 6 is a flow chart illustrating another example in which a stereoscopic image frame is converted into a conversion image frame by a method of FIG. 1.

Referring to FIG. 6, the method of FIG. 1 may judge whether a length of the first image frame is or becomes larger than a length of an active period of the stereoscopic image frame (Step S320) while the first image frame is output from an end point of the active period (i.e., a start point of a vertical blank) of the stereoscopic image frame (Step S310). Generally, a length of the active period of the stereoscopic image frame is larger than a length of the vertical blank of the stereoscopic image frame. Exceptionally, a length of the active period of the stereoscopic image frame may be smaller than a length of the vertical blank of the stereoscopic image frame as a length of the vertical blank of the stereoscopic image frame varies for each stereoscopic image frame. In this case, a length of the stereoscopic image frame cannot be detected while the first image frame is output. Thus, an end point of the first image frame may not be determined because a length of the stereoscopic image frame is unknown. As a result, the first image frame (e.g., a left image frame) and the second image frame (e.g., a right image frame) may be unstably output. To solve this problem, while a length of the first image frame is smaller than a length of the active period of the stereoscopic image frame, the method of FIG. 1 may output the first image frame during a time corresponding to a length of the first image frame which is determined based on a length of the conversion image frame (Step S330), may output the second image frame from an end point of the first image frame which is determined based on a length of the conversion image frame (Step S340), and may output the second image frame during a time corresponding to a length of the second image frame which is determined based on a length of the conversion image frame (Step S350).

The method of FIG. 1 may stop outputting the first image frame at a timing point where a length of the first image frame is or becomes larger than a length of the active period of the stereoscopic image frame (Step S360), may output the second image frame from an end point of the first image frame (Step S370), and may output the second image frame during a time corresponding to a length which is calculated by subtracting a length of the first image frame from a length of the conversion image frame (Step S380). Thus, the method of FIG. 1 may limit a length of the first image frame to a length of the active period of the stereoscopic image frame if a length of the vertical blank of the stereoscopic image frame is larger than a length of the active period of the stereoscopic image frame. As a result, the first image frame and the second image frame may be stably output even during an exceptional situation where a length of the active period of the stereoscopic image frame is smaller than a length of the vertical blank of the stereoscopic image frame occurs.

Figure 7:
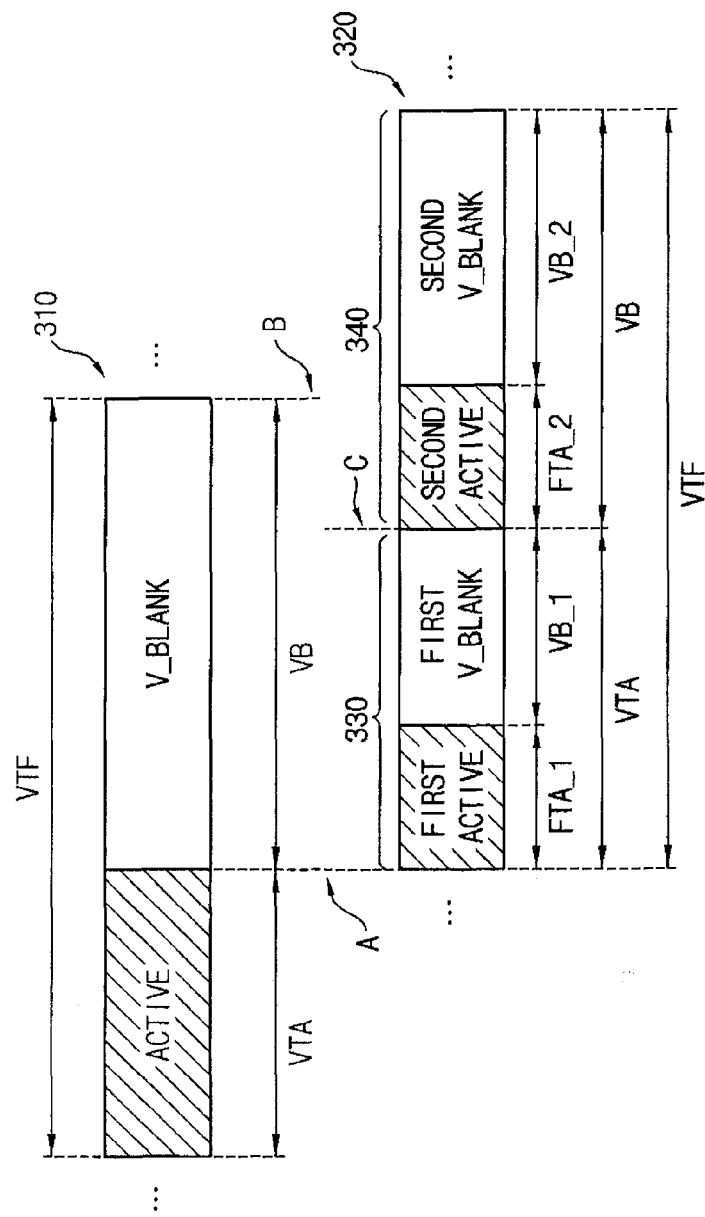
FIG. 7 is a diagram illustrating an example of a conversion image frame that is generated from a stereoscopic image frame in FIG. 6.

FIG. 7 is a diagram illustrating an example of a conversion image frame that is generated from a stereoscopic image frame in FIG. 6.

Referring to FIG. 7, the stereoscopic image frame 310 may be converted into the conversion image frame 320 by the method of FIG. 1. The stereoscopic image frame 310 may include an active period VTA corresponding to stereoscopic image data, and a vertical blank VB for displaying the stereoscopic image data. As described above, a length VTF of the stereoscopic image frame 310 may vary for each stereoscopic image frame because a length of the vertical blank VB of the stereoscopic image frame 310 varies for each stereoscopic image frame. The conversion image frame 320 may include a first image frame 330 and a second image frame 340. The first image frame 330 may correspond to a left image frame. The second image frame 340 may correspond to a right image frame. The first image frame 330 may include a first active period FTA_1 corresponding to first image data, and a first vertical blank VB_1 for displaying the first image data. The second image frame 340 may include a second active period FTA_2, and a second vertical blank VB_2 for displaying the second image data.

As illustrated in FIG. 7, a length of the vertical blank VB of the stereoscopic image frame 310 may vary for each stereoscopic image frame due to a frame rate conversion, a pre-processing, etc., when a stereoscopic image signal having a plurality of stereoscopic image frames is input. In addition, an exceptional situation where a length of the active period VTA of the stereoscopic image frame 310 is smaller than a length of the vertical blank VB of the stereoscopic image frame 310 may occur. That is, a length of the active period VTA of the stereoscopic image frame 310 may be smaller than a half of a length of the stereoscopic image frame 310. In this case, the method of FIG. 1 may limit a length of the first image frame 330 to a length of the active period VTA of the stereoscopic image frame 310. In detail, the method of FIG. 1 may stop outputting the first image frame 330 at a timing point where a length of the first image frame 330 is or becomes larger than a length of the active period VTA of the stereoscopic image frame 310 after the first image frame 330 is output from an end point A of the active period VTA of the stereoscopic image frame 310. Then, the method of FIG. 1 may output the second image frame 340 during a time corresponding to a length which is calculated by subtracting a length of the first image frame 330 from a length of the conversion image frame 320 after the second image frame 340 is output from an end point C of the first image frame 330.

In FIG. 7, it is illustrated that a length VTF of the stereoscopic image frame 310 is the same as a length of the conversion image frame 320 (i.e., sum of the first image frame 330 and the second image frame 340). However, the present invention is not limited to illustrations of FIG. 7. A length of the conversion image frame 320 may be determined based on a length VTF of the stereoscopic image frame 310. In example embodiments, a length VTF of the stereoscopic image frame 310 may be different from a length of the conversion image frame 320 (i.e., sum of the first image frame 330 and the second image frame 340). For example, a length of the conversion image frame 320 may correspond to a set or predetermined length, or a length of the conversion image frame 320 may correspond to a cumulative mean of lengths of all stereoscopic image frames 310. As described above, the method of FIG. 1 may limit a length of the first image frame 330 to a length of the active period VTA of the stereoscopic image frame 310. As a result, the first image frame 330 and the second image frame 340 may be stably output even when an exceptional situation where a length VTA of the active period of the stereoscopic image frame 310 is smaller than a length VB of the vertical blank of the stereoscopic image frame 310 occurs.

Figure 8:
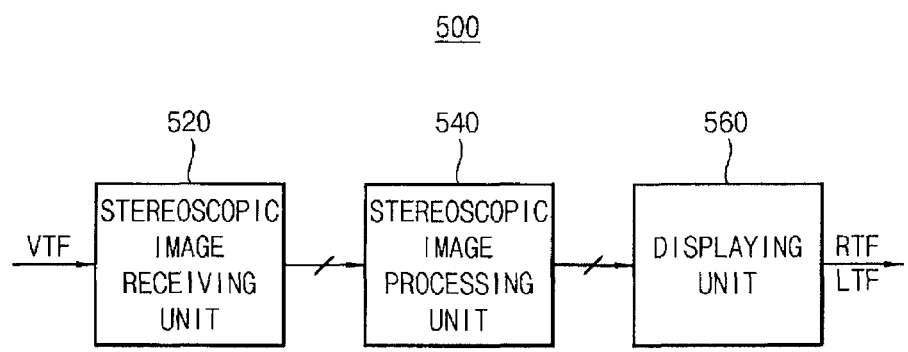
FIG. 8 is a block diagram illustrating a stereoscopic image display device according to example embodiments.

FIG. 8 is a block diagram illustrating a stereoscopic image display device 500 according to example embodiments.

Referring to FIG. 8, the stereoscopic image display device 500 may include a stereoscopic image receiving unit 520, a stereoscopic image processing unit 540, and a displaying unit 560.

The stereoscopic image receiving unit 520 may receive a stereoscopic image frame VTF to output the stereoscopic image frame VTF to the stereoscopic image processing unit 540. The stereoscopic image frame VTF may include an active period and a vertical blank of which a length varies for each stereoscopic image frame. In some example embodiments, the stereoscopic image receiving unit 520 may be implemented by a buffer device that receives a stereoscopic image signal having a plurality of stereoscopic image frames VTF, and that sequentially output the stereoscopic image frames VTF to the stereoscopic image processing unit 540. The stereoscopic image display device 500 may receive the stereoscopic image signal by a high definition multimedia interface (HDMI). Then, the stereoscopic image display device 500 may sequentially divide the stereoscopic image frames VTF of the stereoscopic image signal into a first image frame LTF and a second image frame RTF, and may sequentially output the first image frame LTF and the second image frame RTF. For example, the first image frame LTF may correspond to a left image frame, and the second image frame RTF may correspond to a right image frame. The stereoscopic image processing unit 540 may divide the stereoscopic image frame VTF into the first image frame LTF and the second image frame RTF based on an end point of an active period of the stereoscopic image frame VTF. The first image frame LTF may include a first active period corresponding to first image data, and a first vertical blank for displaying the first image data. The second image frame RTF may include a second active period corresponding to second image data, and a second vertical blank for displaying the second image data. In one example embodiment, the stereoscopic image display device 500 may employ a shutter glasses method. In another example embodiment, the stereoscopic image display device 500 may employ a parallax barrier method. Thus, the stereoscopic image display device 500 may display a stereoscopic image by sequentially outputting the first image frame LTF (e.g., a left image frame) and the second image frame RTF (e.g., a right image frame) to a left eye and a right eye, respectively.

The stereoscopic image processing unit 540 may include a detection block that detects a length of the stereoscopic image frame VTF; a first determination block that determines a length of a conversion image frame (i.e., sum of the first image frame LTF and the second image frame RTF) based on a length of the stereoscopic image frame VTF; a second determination block that determines a length of the first image frame LTF and a length of the second image frame RTF by a set or predetermined ratio based on a length of the conversion image frame; and an output block that sequentially outputs (1) the first image frame LTF from an end point of the active period (i.e., a start point of the vertical blank) of the stereoscopic image frame VTF during a time corresponding to a length of the first image frame LTF and (2) the second image frame RTF from an end point of the first image frame LTF during a time corresponding to a length of the second image frame RTF. Hence, the stereoscopic image display device 500 may distribute the vertical blank of the stereoscopic image frame VTF to the first image frame LTF and the second image frame RTF by a required ratio for systems (e.g., by a ratio of 1:1) by determining a length of the first image frame LTF and a length of the second image frame RTF by a set or predetermined ratio (e.g., by a ratio of 1:1).

In one example embodiment, the stereoscopic image processing unit 540 may determine a length of the first image frame LTF to be the same as a length of the second image frame RTF. In this case, a length of the first vertical blank of the first image frame LTF may be the same as a length of the second vertical blank of the second image frame RTF because a length of the first active period of the first image frame LTF is the same as a length of the second active period of the second image frame RTF. In another example embodiment, the stereoscopic image processing unit 540 may determine a length of the first image frame LTF to be different from a length of the second image frame RTF. In this case, a length of the first vertical blank of the first image frame LTF may be different from a length of the second vertical blank of the second image frame RTF because a length of the first active period of the first image frame LTF is the same as a length of the second active period of the second image frame RTF. In example embodiments, a length of the first active period of the first image frame LTF and a length of the second active period of the second image frame RTF may correspond to a half of a length of the active period of the stereoscopic image frame VTF, respectively. In addition, a length of the stereoscopic image frame VTF may correspond to a length between a start point of the stereoscopic image frame VTF and an end point of the stereoscopic image frame VTF.

The displaying unit 560 may display a stereoscopic image by sequentially outputting the first image frame LTF and the second image frame RTF that are generated by the stereoscopic image processing unit 540. For example, the stereoscopic image display device 500 may display the stereoscopic image by dividing the stereoscopic image frame VTF into a left image frame LTF and a right image frame RTF, and by providing the left image frame LTF and the right image frame RTF to the left eye and the right eye, respectively. In some example embodiments, the stereoscopic image display device 500 may generate a synchronization signal for providing the first image frame LTF and the second image frame RTF to the left eye and the right eye, respectively. For example, when the stereoscopic image display device 500 employs the shutter glasses method, the first image frame LTF and the second image frame RTF may be synchronized with a left shutter and a right shutter based on the synchronization signal. As described above, even when the stereoscopic image frame VTF in which a length of a vertical period varies for each stereoscopic image frame is divided into the first image frame LTF and the second image frame RTF, the stereoscopic image display device 500 may accurately control a length of the first image frame LTF and a length of the second image frame RTF by calculating (i.e., reflecting) a length of the stereoscopic image frame VTF in real time. As a result, a vertical blank of the stereoscopic image frame VTF may be distributed to the first image frame LTF and the second image frame RTF by a required ratio for systems (e.g., by a ratio of 1:1).

Figure 9:
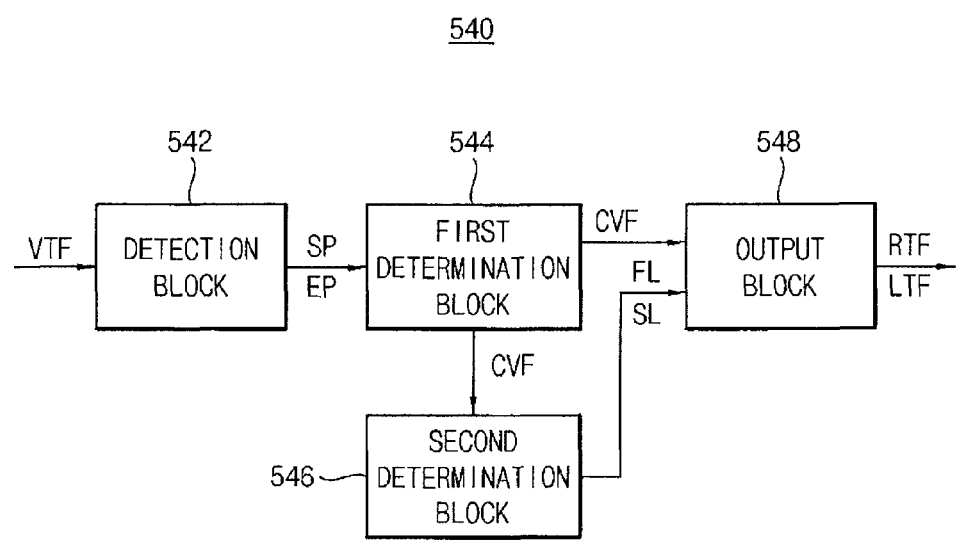
FIG. 9 is a block diagram illustrating an example of a stereoscopic image processing unit in the stereoscopic image display device of FIG. 8.

FIG. 9 is a block diagram illustrating an example of the stereoscopic image processing unit 540 in the stereoscopic image display device 500 of FIG. 8.

Referring to FIG. 9, the stereoscopic image processing unit 540 may include a detection block 542, a first determination block 544, a second determination block 546, and an output block 548.

The detection block 542 may detect a length of the stereoscopic image frame VTF. In one example embodiment, the detection block 542 may detect a length of the stereoscopic image frame VTF based on a start point SP of the stereoscopic image frame VTF and an end point EP of the stereoscopic image frame VTF. For example, a length of the stereoscopic image frame VTF may correspond to a length between the start point SP of the stereoscopic image frame VTF and an end point EP of the stereoscopic image frame VTF. As described above, an end point EP of the stereoscopic image frame VTF may correspond to a start point of a next stereoscopic image frame. The first determination block 544 may determine a length of a conversion image frame CVF (i.e., sum of the first image frame LTF and the second image frame RTF) based on a length of the stereoscopic image frame VTF. In example embodiments, a length of the conversion image frame CVF may be the same as a length of the stereoscopic image frame VTF, or may be different from a length of the stereoscopic image frame VTF. For example, when a length of the conversion image frame CVF is determined to be different from a length of the stereoscopic image frame VTF, a length of the conversion image frame CVF may correspond to a set or predetermined length, or a cumulative mean of lengths of all stereoscopic image frames VTF. The second determination block 546 may determine a length FL of the first image frame LTF and a length SL of the second image frame RTF by a set or predetermined ratio based on a length of the conversion image frame CVF. Here, the set or predetermined ratio may be determined according to required conditions for systems. Generally, it is desirable that a length FL of the first image frame LTF is determined to be the same as a length SL of the second image frame RTF (i.e., by a ratio of 1:1) in order to reduce a luminance difference between the first image frame LTF and the second image frame RTF. In this case, a length of the first vertical blank of the first image frame LTF may be the same as a length of the second vertical blank of the second image frame RTF.

The output block 548 may output the first image frame LTF from an end point EP of the active period of the stereoscopic image frame VTF during a time corresponding to a length FL of the first image frame LTF, and may output the second image frame RTF from an end point of the first image frame LTF during a time corresponding to a length SL of the second image frame RTF. In detail, the first image frame LTF may be output from an end point of the active period (i.e., a start point of the vertical blank) of the stereoscopic image frame VTF during a time corresponding to a length FL of the first image frame LTF, and the second image frame RTF may be output from an end point of the first image frame LTF during a time corresponding to a length SL of the second image frame RTF. As described above, an end point of the stereoscopic image frame VTF may be detected while the first image frame LTF is output. Hence, the stereoscopic image frame VTF may be divided into the first image frame LTF and the second image frame RTF by a set or predetermined ratio (e.g., by a ratio of 1:1) by calculating (i.e., reflecting) a length of the stereoscopic image frame VTF in real time. In other words, a length FL of the left image frame LTF and a length SL of the right image frame RTF may be accurately controlled because a length of the stereoscopic image frame VTF can be calculated (i.e., reflected) in real time. In example embodiments, the stereoscopic image display device 540 may stop outputting the second image frame RTF at an end point of an active period of a next stereoscopic image frame if the active period of the next stereoscopic image frame ends while the second image frame RTF is output.

The stereoscopic image processing unit 540 may detect an end point of the stereoscopic image frame VTF (i.e., a start point of a next stereoscopic image frame) while the first image frame LTF is output because the stereoscopic image frame VTF is converted into the conversion image frame CVF (i.e., divided into the first image frame LTF and the second image frame RTF) from an end point of the active period of the stereoscopic image frame VTF. Thus, the stereoscopic image processing unit 540 may divide the stereoscopic image frame VTF into the first image frame LTF and the second image frame RTF by a set or predetermined ratio (e.g., by a ratio of 1:1) based on a length of the stereoscopic image frame VTF. That is, the stereoscopic image processing unit 540 may control a length of the first vertical blank of the first image frame LTF and a length of the second vertical blank of the second image frame RTF. Hence, a luminance difference between the first image frame LTF and the second image frame RTF may be efficiently adjusted to prevent or reduce a phenomenon such as a flicker.

Figure 10:
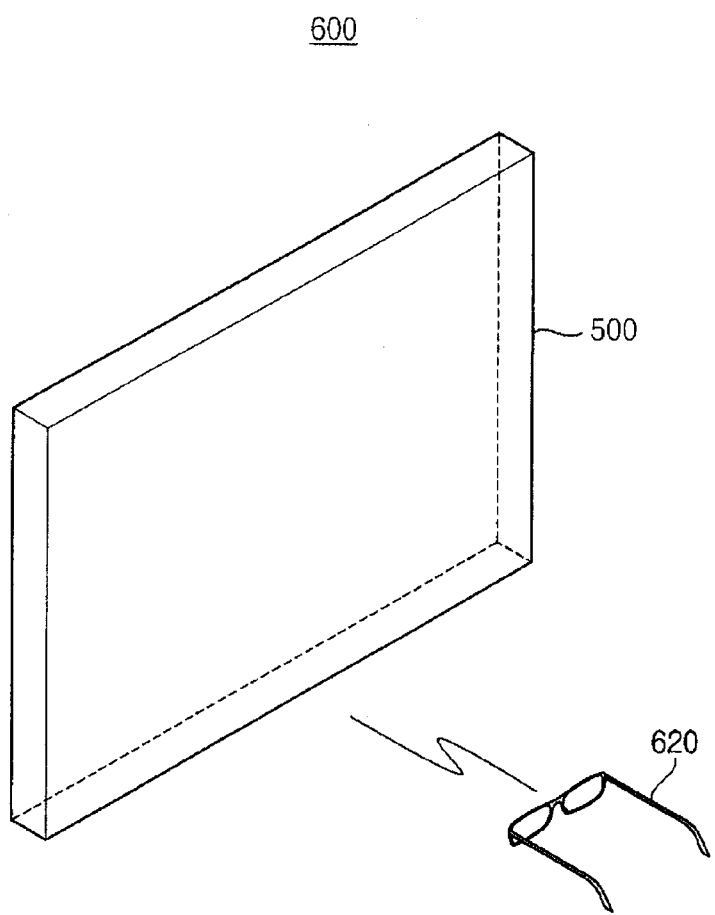
FIG. 10 is a diagram illustrating a stereoscopic image display system that employs a shutter glasses method.

FIG. 10 is a diagram illustrating a stereoscopic image display system 600 that employs a shutter glasses method.

Referring to FIG. 10, the stereoscopic image display system 600 may include the stereoscopic image display device 500 and shutter glasses 620.

The stereoscopic image display device 500 may sequentially output a first image frame (e.g., a left image frame) and a second image frame (e.g., a right image frame) that are generated from a stereoscopic image frame. In some example embodiments, the stereoscopic image display device 500 may generate a synchronization signal for providing the first image frame and the second image frame to a left eye and a right eye, respectively. Thus, the first image frame and the second image frame may be synchronized with a left shutter and a right shutter based on the synchronization signal. As described above, the stereoscopic image display device 500 may control a length of the first image frame and a length of the second image frame by calculating (i.e., reflecting) a length of the stereoscopic image frame in real time even when a length of a vertical blank of the stereoscopic image frame varies for each stereoscopic image frame.

The shutter glasses 620 may open/close a left shutter and a right shutter in synchronization with the first image frame and the second image frame, respectively when the stereoscopic image display device 500 sequentially outputs the first image frame and the second image frame that are generated from the stereoscopic image frame. For example, the shutter glasses 620 may open the left shutter based on the synchronization signal when the stereoscopic image display device 500 outputs a left image frame, and may open the right shutter based on the synchronization signal when the stereoscopic image display device 500 outputs a right image frame. In some example embodiments, the stereoscopic image display device 500 may provide the shutter glasses 620 with the synchronization signal using various wire/wireless methods. As described above, when the stereoscopic image display device 500 divides the stereoscopic image frame into the first image frame and the second image frame by a ratio of 1:1, a length of a first vertical blank of the first image frame may be the same as a length of a second vertical blank of the second image frame. Hence, a quality of a stereoscopic image may be improved because a luminance difference between the first image frame and the second image frame is prevented or reduced.

Figure 11:
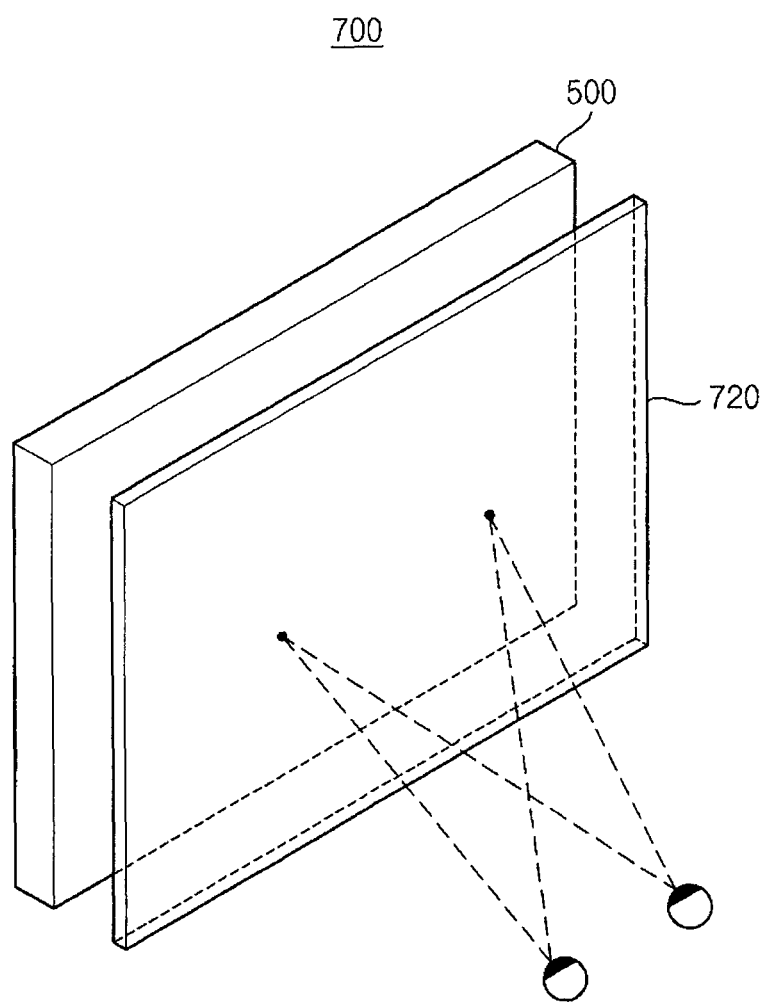
FIG. 11 is a diagram illustrating a stereoscopic image display system that employs a parallax barrier method.

FIG. 11 is a diagram illustrating a stereoscopic image display system 700 that employs a parallax barrier method.

Referring to FIG. 11, the stereoscopic image display system 700 may include the stereoscopic image display device 500 and a parallax barrier 720.

The stereoscopic image display device 500 may sequentially output a first image frame (e.g., a left image frame) and a second image frame (e.g., a right image frame) that are generated from a stereoscopic image frame. In some example embodiments, the stereoscopic image display device 500 may generate a synchronization signal for providing the first image frame and the second image frame to a left eye and a right eye, respectively. Thus, the first image frame and the second image frame may be synchronized with a left shutter and a right shutter based on the synchronization signal. As described above, the stereoscopic image display device 500 may control a length of the first image frame and a length of the second image frame by calculating (i.e., reflecting) a length of the stereoscopic image frame in real time even when a length of a vertical blank of the stereoscopic image frame varies for each stereoscopic image frame.

The parallax barrier 720 may alternatively allow the first image frame and the second image frame to pass through after the stereoscopic image display device 500 divides the stereoscopic image frame into the first image frame (e.g., a left image frame) and the second image frame (e.g., a right image frame). In detail, the parallax barrier 720 may alternatively provide the first image frame (i.e., a left image frame) and the second image frame (i.e., right image frame) to the left eye and the right eye by changing positions of opening areas and blocking areas of the parallax barrier 720. As described above, when the stereoscopic image display device 500 divides the stereoscopic image frame into the first image frame and the second image frame by a ratio of 1:1, a length of a first vertical blank of the first image frame may be the same as a length of a second vertical blank of the second image frame. Hence, a quality of a stereoscopic image may be improved because a luminance difference between the first image frame and the second image frame is prevented or reduced.

Figure 12:
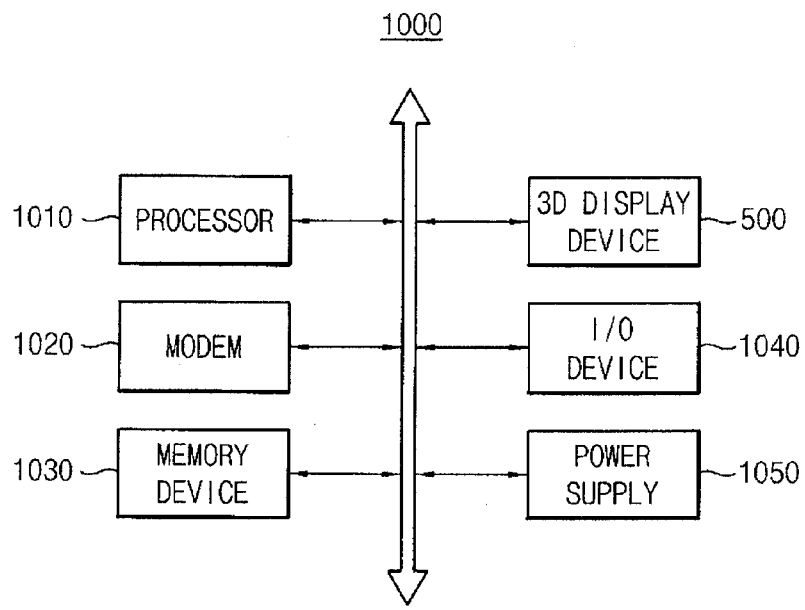
FIG. 12 is a block diagram illustrating a mobile device having the stereoscopic image display device of FIG. 8.

FIG. 12 is a block diagram illustrating a mobile device 1000 having the stereoscopic image display device 500 of FIG. 8.

Referring to FIG. 12, the mobile device 1000 may include a processor 1010, a modem 1020, a memory device 1030, an input/output (I/O) device 1040, a power supply 1050, and the stereoscopic image display device 500. As not illustrated in FIG. 12, the mobile device 1000 may further include a plurality of components such as a camera image processor (CIP). Here, the mobile device 1000 may correspond to a cellular phone, a smart phone, a personal digital assistant (PDA), a portable multimedia player (PMP), an MP3 player, a mobile game console, a navigation system, etc.

The processor 1010 may perform various computing functions. For example, the processor 1010 may execute applications such as an internet browser application, a 3D-map application, etc. The processor 1010 may be a micro processor, a central processing unit (CPU), etc. The processor 1010 may be coupled to other components via an address bus, a control bus, a data bus, etc. The modem 1020 may receive external data from outside, and may transmit internal data to outside. For example, the modem 1020 may be a modem processor that supports a global system for mobile communication (GSM), a general packet radio service (GPRS), a wideband code division multiple access (WCDMA), etc. In some example embodiments, the processor 1010 and the modem 1020 may be implemented in one chip. The memory device 1030 may store data for operations of the mobile device 1000. In some example embodiments, the memory device 1030 may include one or more non-volatile memory devices and/or one or more volatile memory devices. In this case, the non-volatile memory device may store a boot-code for booting the mobile device 1000. For example, the non-volatile memory device may correspond to an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In addition, the volatile memory device may store data received or transmitted by the modem 1020, and data processed by the processor 1010. For example, the volatile memory device may correspond to a dynamic random access memory (DRAM) device, a static random access memory (SRAM) device, a mobile dynamic random access memory (mobile DRAM) device, etc. The I/O device 1040 may be an input device such as a keyboard, a keypad, a mouse, a touch screen, etc, and an output device such as a printer, a speaker, etc. In some example embodiments, the stereoscopic image display device 500 may be included as the output device in the I/O device 1040. The power supply 1050 may provide a power for operations of the mobile device 1000.

The stereoscopic image display device 500 may communicate with other components via the buses or other communication links. As described above, the stereoscopic image display device 500 may display stereoscopic images based on a stereoscopic image signal having a plurality of stereoscopic image frames. Here, the stereoscopic image display device 500 may control a length of a first image frame (e.g., a left image frame) and a length of a second image frame (e.g., a right image frame) by calculating (i.e., reflecting) a length of the stereoscopic image frame in real time even when a length of a vertical blank of the stereoscopic image frame varies for each stereoscopic image frame. For this operation, the stereoscopic image display device 500 may include a stereoscopic image receiving unit that receives the stereoscopic image frame, a stereoscopic image processing unit that divides the stereoscopic image frame into the first image frame and the second image frame, and a displaying unit that sequentially outputs the first image frame and the second image frame. Since the components of the stereoscopic image display device 500 (i.e., the stereoscopic image receiving unit, the stereoscopic image processing unit, and the displaying unit) are described above, descriptions of the components of the stereoscopic image display device 500 will be omitted. The stereoscopic image display device 500 may reduce a luminance difference between the first image frame and the second image frame by distributing the vertical blank of the stereoscopic image frame to the first image frame and the second image frame by a required ratio for systems (e.g., by a ratio of 1:1). As a result, a quality of a stereoscopic image may be improved because a phenomenon such as a flicker is prevented or reduced. The mobile device 1000 may be implemented by various suitable packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP), etc.

Figure 13:
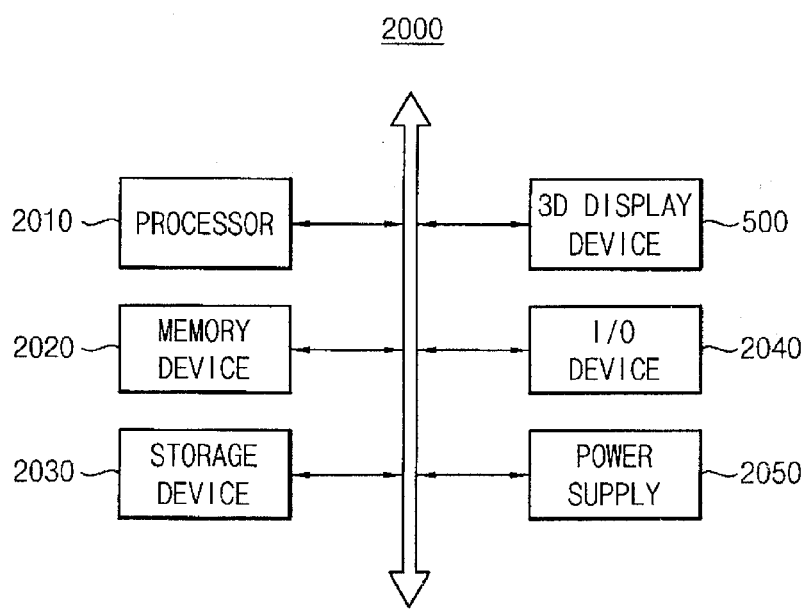
FIG. 13 is a block diagram illustrating an electric device having the stereoscopic image display device of FIG. 8.

FIG. 13 is a block diagram illustrating an electric device 2000 having a stereoscopic image display device of FIG. 8.

Referring to FIG. 13, the electric device 2000 may include a processor 2010, a memory device 2020, a storage device 2030, an input/output (I/O) device 2040, a power supply 2050, and the stereoscopic image display device 500. The electric device 2000 may further include a plurality of ports for communicating a video card, a sound card, a memory card, a universal serial bus (USB) device, other electric devices, etc. Here, the electric device 2000 may correspond to a television, a computer, a laptop, etc.

The processor 2010 may perform various computing functions. The processor 2010 may be a micro processor, a central processing unit (CPU), etc. The processor 2010 may be coupled to other components via an address bus, a control bus, a data bus, etc. Further, the processor 2010 may be coupled to an extended bus such as a peripheral component interconnection (PCI) bus. The memory device 2020 may store data for operations of the electric device 2000. The memory device 2020 may include at least one non-volatile memory device and at least one volatile memory device. For example, the non-volatile memory device may correspond to an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In addition, the volatile memory device may correspond to a dynamic random access memory (DRAM) device, a static random access memory (SRAM) device, a mobile dynamic random access memory (mobile DRAM) device, etc. The storage device 2030 may be a solid state drive device, a hard disk drive device, a CD-ROM device, etc. The I/O device 2040 may be an input device such as a keyboard, a keypad, a mouse, a touch screen, etc, and an output device such as a printer, a speaker, etc. In some example embodiments, the stereoscopic image display device 500 may be included as the output device in the I/O device 2040. The power supply 2050 may provide a power for operations of the electric device 2000.

The stereoscopic image display device 500 may communicate with other components via the buses or other communication links. As described above, the stereoscopic image display device 500 may display stereoscopic images based on a stereoscopic image signal having a plurality of stereoscopic image frames. Here, the stereoscopic image display device 500 may control a length of a first image frame (e.g., a left image frame) and a length of a second image frame (e.g., a right image frame) by calculating (i.e., reflecting) a length of the stereoscopic image frame in real time even when a length of the vertical blank of the stereoscopic image frame varies for each stereoscopic image frame. For this operation, the stereoscopic image display device 500 may include a stereoscopic image receiving unit that receives the stereoscopic image frame, a stereoscopic image processing unit that divides the stereoscopic image frame into the first image frame and the second image frame, and a displaying unit that sequentially outputs the first image frame and the second image frame. Since the components of the stereoscopic image display device 500 (i.e., the stereoscopic image receiving unit, the stereoscopic image processing unit, and the displaying unit) are described above, descriptions of the components of the stereoscopic image display device 500 will be omitted. The stereoscopic image display device 500 may reduce a luminance difference between the first image frame and the second image frame by distributing the vertical blank of the stereoscopic image frame to the first image frame and the second image frame by a required ratio for systems (e.g., by a ratio of 1:1). As a result, a quality of a stereoscopic image may be improved because a phenomenon such as a flicker is prevented or reduced.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of displaying stereoscopic images, the method comprising:
   receiving a stereoscopic image frame having an active period and a vertical blank, a length of the vertical blank varying for each stereoscopic image frame;
   dividing the stereoscopic image frame into a first image frame and a second image frame based on an end point of the active period of the stereoscopic image frame; and
   sequentially outputting the first image frame and the second image frame,
   wherein the first image frame is output from the end point of the active period of the stereoscopic image frame, and the second image frame is output from an end point of the first image frame;
   wherein the dividing the stereoscopic image frame comprises:
   detecting a length of the stereoscopic image frame based on a start point of the stereoscopic image frame and an end point of the stereoscopic image frame;
   determining a length of a conversion image frame based on the length of the stereoscopic image frame, the conversion image frame having the first image frame and the second image frame; and
   determining a length of the first image frame and a length of the second image frame by a set ratio based on the length of the conversion image frame.

2. The method of claim 1, wherein the first image frame corresponds to a left image frame, and the second image frame corresponds to a right image frame.

3. The method of claim 1, wherein the first image frame includes a first active period and a first vertical blank, and the second image frame includes a second active period and a second vertical blank.

4. The method of claim 3, wherein a length of the first active period and a length of the second active period each correspond to a half of a length of the active period of the stereoscopic image frame.

5. The method of claim 3, wherein the length of the first image frame is determined to be the same as the length of the second image frame.

6. The method of claim 5, wherein a length of the first active period is the same as a length of the second active period, and a length of the first vertical blank is the same as a length of the second vertical blank.

7. The method of claim 3, wherein the length of the first image frame is determined to be different from the length of the second image frame.

8. The method of claim 7, wherein a length of the first active period is the same as a length of the second active period, and a length of the first vertical blank is different from a length of the second vertical blank.

9. A method of displaying stereoscopic images, the method comprising:
   receiving a stereoscopic image frame having an active period and a vertical blank, a length of the vertical blank varying for each stereoscopic image frame;
   dividing the stereoscopic image frame into a first image frame and a second image frame based on an end point of the active period of the stereoscopic image frame; and
   sequentially outputting the first image frame and the second image frame,
   wherein the first image frame includes a first active period and a first vertical blank, and the second image frame includes a second active period and a second vertical blank, and
   wherein the dividing the stereoscopic image frame comprises:
   detecting a length of the stereoscopic image frame based on a start point of the stereoscopic image frame and an end point of the stereoscopic image frame;

determining a length of a conversion image frame based on the length of the stereoscopic image frame, the conversion image frame having the first image frame and the second image frame;

determining a length of the first image frame and a length of the second image frame by a set ratio based on the length of the conversion image frame;

outputting the first image frame from the end point of the active period of the stereoscopic image frame during a time corresponding to the length of the first image frame; and outputting the second image frame from an end point of the first image frame during a time corresponding to the length of the second image frame.

10. The method of claim 9, further comprising:

determining the length of the first image frame to be the same as a length of the active period of the stereoscopic image frame when the length of the stereoscopic image frame is more than twice as long as the length of the active period of the stereoscopic image frame.

11. The method of claim 9, wherein the length of the conversion image frame corresponds to the length of the stereoscopic image frame.

12. The method of claim 9, wherein the length of the conversion image frame corresponds to a cumulative mean of lengths of all stereoscopic image frames.

13. The method of claim 9, wherein the length of the conversion image frame corresponds to a set length.

14. A stereoscopic image display device, comprising:

a stereoscopic image receiving unit to receive a stereoscopic image frame having an active period and a vertical blank, a length of the vertical blank varying for each stereoscopic image frame, and to output the stereoscopic image frame to a stereoscopic image processing unit;

the stereoscopic image processing unit coupled to the stereoscopic image receiving unit via a bus to divide the stereoscopic image frame into a first image frame and a second image frame based on an end point of the active period of the stereoscopic image frame; and a displaying unit coupled to the stereoscopic image processing unit via another bus to sequentially output the first image frame and the second image frame, wherein the first image frame is output from the end point of the active period of the stereoscopic image frame, and the second image frame is output from an end point of the first image frame;

wherein to divide the stereoscopic image frame, the stereoscopic image processing unit is configured to:

detect a length of the stereoscopic image frame based on a start point of the stereoscopic image frame and an end point of the stereoscopic image frame;

determine a length of a conversion image frame based on the length of the stereoscopic image frame, the conversion image frame having the first image frame and the second image frame; and determine a length of the first image frame and a length of the second image frame by a set ratio based on the length of the conversion image frame.

15. The device of claim 14, wherein the first image frame corresponds to a left image frame, and the second image frame corresponds to a right image frame.

16. The device of claim 15, wherein the left image frame is configured to be displayed on a left shutter, and the right image frame is configured to be displayed on a right shutter when a shutter glasses method is employed.

17. The device of claim 14, wherein the first image frame includes a first active period and a first vertical blank, and the second image frame includes a second active period and a second vertical blank.

18. The device of claim 17, wherein the length of the first image frame is configured to be determined by the stereoscopic image processing unit to be the same as the length of the second image frame.

19. The device of claim 17, wherein the length of the first image frame is configured to be determined by the stereoscopic image processing unit to be different from the length of the second image frame.

20. The device of claim 17, wherein the stereoscopic image processing unit comprises:

a detecting unit to detect the length of the stereoscopic image frame based on the start point of the stereoscopic image frame and the end point of the stereoscopic image frame;

a first determining unit to determine the length of the conversion image frame based on the length of the stereoscopic image frame, the conversion image frame having the first image frame and the second image frame;

a second determining unit to determine the length of the first image frame and the length of the second image frame by the set ratio based on the length of the conversion image frame; and an outputting unit to output the first image frame from the end point of the active period of the stereoscopic image frame during a time corresponding to the length of the first image frame, and to output the second image frame from an end point of the first image frame during a time corresponding to the length of the second image frame.

* * * * *